United States Patent [19]

Warnagiris

[11] Patent Number: 4,903,324

[45] Date of Patent: Feb. 20, 1990

[54] RING AROUND TRANSCEIVER

[75] Inventor: Thomas J. Warnagiris, San Antonio, Tex.

[73] Assignee: Colin Electronics Co., Ltd., Komaki, Japan

[21] Appl. No.: 150,542

[22] Filed: Feb. 1, 1988

[51] Int. Cl.$^4$ .............................................. H04B 1/00
[52] U.S. Cl. ........................................ 455/69; 455/70; 455/88
[58] Field of Search ...................... 455/76, 85, 88, 62, 455/63, 67, 276, 214, 337, 260, 264, 62, 69, 70

[56] References Cited

U.S. PATENT DOCUMENTS

| | | | |
|---|---|---|---|
| 3,001,064 | 9/1961 | Alexis et al. | 455/62 |
| 3,641,433 | 2/1972 | Mifflin et al. | 375/1 |
| 3,745,464 | 7/1973 | Lee | 455/69 |
| 3,764,917 | 10/1973 | Rhee | 455/264 |
| 4,019,138 | 4/1977 | Watanabe et al. | 455/69 |
| 4,140,973 | 2/1979 | Stevens | 455/62 |

Primary Examiner—Joseph A. Orsino
Assistant Examiner—Frank M. Scutch, III
Attorney, Agent, or Firm—Matthews & Branscomb

[57] ABSTRACT

The communications system of the present invention defines a complete feedback path consisting of first and second transceivers and an appropriate signal path. Each transceiver comprises a detector and a signal source capable of generating a signal at one of two frequencies. The detector in each of the transceivers is a two state device tuned to respond only to a predetermined desired difference frequency. If the desired difference frequency signal is present, the detector provides and output signal in a first state; if the desired difference signal is not present, the detector provides an output signal which is in a second state. The signal source can be a voltage controlled oscillator, a pair of single frequency oscillators, a synthesizer, or any signal source capable of being electrically switched between two frequencies. Data can be exchanged between the transceiver pair only when the desired difference frequency is present.

18 Claims, 10 Drawing Sheets

RING AROUND TRANSCEIVER

FIELD OF THE INVENTION

The present invention relates generally to communications systems and, more specifically, to communications systems which must be capable of operating on very low power and further capable of detecting errors when operating in noisy environments.

BACKGROUND

One of the problems which is often encountered in communications systems is loss of data due to environmental electromagnetic interference and other spurious ambient interference signals. This problem is especially acute when operating long wave communications systems in a noisy environment at very low power levels. In addition to the problem of loss of data due to interference, there is often concern over the security of data signal transmission—both in terms of ensuring that the data which is transmitted by a first transceiver is actually received at a second transceiver and also ensuring that transmitted data is not modified by an undesired third party.

Thus far, the prior art has not provided an effective communications system which can provide adequate data security and accuracy when operating at very low power levels in a noisy environment. The communications system of the present invention overcomes the difficulties of the prior art by providing a low power communications system which is capable of providing accurate and secure data communications even in extremely noisy environments.

SUMMARY OF THE INVENTION

The communications system of the present invention defines a complete feedback path consisting of first and second transceivers and an appropriate signal path. Each transceiver comprises a detector and a signal source capable of generating a signal at one of two frequencies. The detector in each of the transceivers is a two state device tuned to respond only to a predetermined desired difference frequency. If the desired difference frequency signal is present, the detector provides and output signal in a first state; if the desired difference signal is not present, the detector provides an output signal which is in a second state. The signal source can be a voltage controlled oscillator, a pair of single frequency oscillators, a synthesizer, or any signal source capable of being electrically switched between two frequencies. Data can be exchanged between the transceiver pair only when the desired difference frequency is present.

In operation of the system, an amplified signal from the first transceiver is received by the second transceiver. In the second transceiver the received signal is mixed with the output signal of the second transceiver in a mixer to produce a difference frequency. The difference frequency signal is then amplified to a level sufficient for detection by the second transceiver's detector. The difference frequency produced in the second transceiver is used to control the output frequency of the data signal transmitted by the second transceiver. The frequency of the data signal transmitted by the second transceiver, in turn, controls the difference frequency generated in the first transceiver and thus controls the ability of the two transceivers to complete the feedback path.

The communications system of the present invention can be implemented in either a digital or an analog embodiment. Furthermore, each of these embodiments can be adapted to operate in either a positive or a negative feedback mode. In the preferred embodiment of the digital system the detector operates in conjunction with a conventional flip-flop circuit. If a signal transmitted by a first transceiver is received by a second transceiver and a correct difference signal is detected, the detector of the second transceiver will produce an output signal which will clock a flip-flop which will change state and cause the signal source in the second transceiver to change from a first frequency to a second frequency. At the first transceiver the signal from the second transceiver is received, mixed, amplified, detected, and applied to the clock input of a flip-flop. The flip-flop in the first transceiver changes the frequency of the signal source if a signal is detected. This completes the feedback path. In the analog version of the invention communications system, the above-described function of the flip-flop is performed by a differential amplifier. The differential amplifier is used to control the output frequency of a voltage controlled oscillator.

In the negative feedback version of the invention communications system, the transceivers are adapted to randomly shift on noise signals until each transceiver detects the signal from the other transceiver. Once the signal is detected, the transceivers "lock" on a particular frequency and continue to transmit on the locked frequency until disturbed by signal modulation or noise.

In the positive feedback embodiment of the invention the detector frequencies and signal source frequencies of the respective transceivers are such that the difference frequencies of the signal source from the first transceiver and the second transceiver are equal to either the detector frequency of the first transceiver or the second transceiver, thus causing astable clocking (oscillation) to occur. The astable clocking is sustained at a frequency determined by the signal path round trip path delay. This delay is determined by the detector time constant, although the transceivers can be adapted to sustain astable oscillation at a frequency determined by other components in the closed loop signal path.

In another embodiment of the communications system of the present invention, one or both of the transceivers is provided with an automatic power control system. The automatic power control system produces an output signal which is directly proportional to the noise introduced into the closed loop signal path between the two transceivers. The noise signal is used to control a variable attenuator which increases or decreases the output of the respective transceiver to maintain a constant signal-to-noise ratio.

The communications system provided by the present invention provides a number of advantages which are especially important for systems operating at very low frequencies or operating in noisy transmission mediums. In particular, the invention system is capable of continuously monitoring the signal condition and is capable of maintaining a constant bit error rate regardless of the condition of the signal path. In addition, the communications system of the present invention can be constructed with a minimum number of components and is capable of being operated at extremely low power levels.

DETAILED DESCRIPTION OF THE PREFERRED EMBODIMENT

Figure 1:
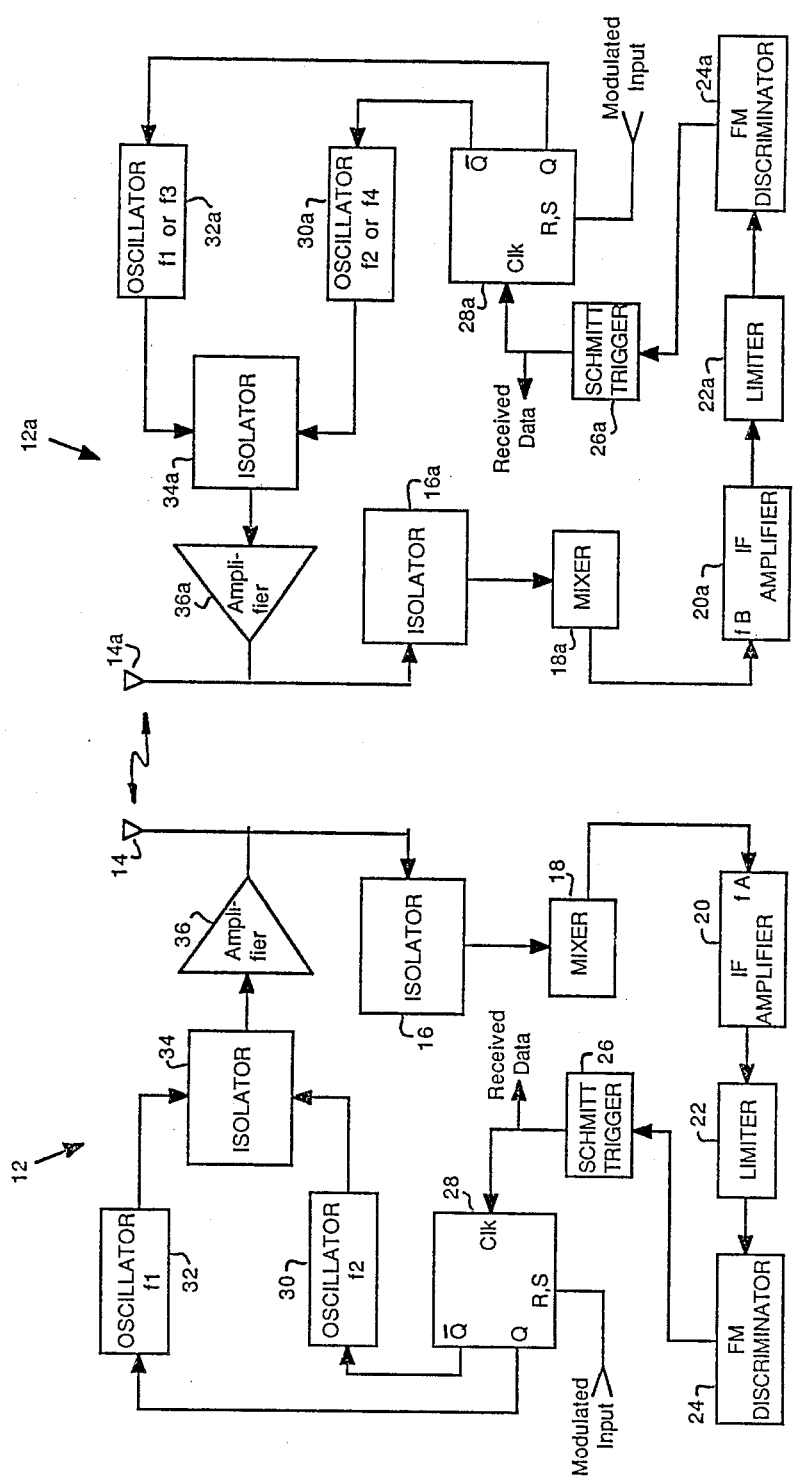
FIG. 1 is a schematic block diagram of the communications system of the present invention, showing the major system components of the digital version of the preferred embodiment.
Figure 2:
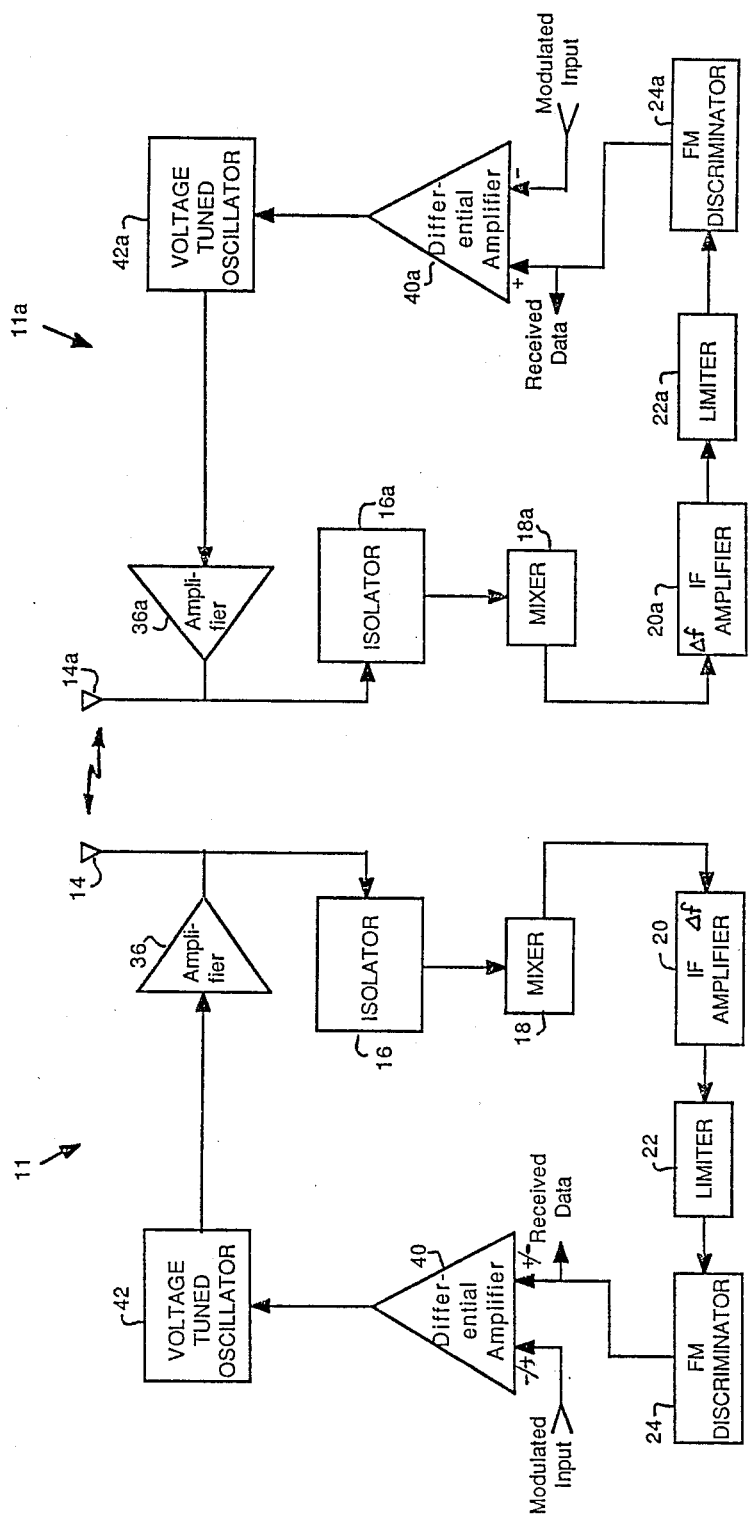
FIG. 2 is a is schematic block diagram of the communications system of the present invention, showing the major system components of the analog version of the preferred embodiment.

The preferred embodiments of the communications system of the present invention is shown in the schematic block diagrams of FIGS. 1 and 2. FIG. 1 is a schematic representation of the digital embodiment of the invention and FIG. 2 is a schematic representation of an analog embodiment of the system. The operating features of each of these embodiments will be discussed below in connection with both positive and negative feedback versions of each system.

Reference is now made to FIG. 1, which is a schematic representation of the digital embodiment of the invention communications system. The system is broadly comprised of first and second transceivers 12 and 12a, respectively and an appropriate signal path. Referring to the first transceiver 12, an incoming signal is received in antenna 14 and is isolated in isolator 16. The isolated received signal is then mixed in mixer 18 with the output signal of the first transceiver to produce a difference frequency. The isolator used in the preferred embodiment of the invention provides approximately 40 dB of isolation. The mixer 18 can be any non-linear device such as a FET, a diode, or transistor. The difference frequency produced by the mixer 18 is then amplified by an intermediate frequency (IF) amplifier 20 to a level sufficient for detection. The IF amplifier used in the preferred embodiment provides approximately 80 dB of signal gain. The output signal produced by the IF amplifier 20 is then limited by a limiter 22 to provide an appropriate signal level for the detector, described below. In the preferred embodiment, the limiter 22 limits the signal to approximately 0.2 volts peak-to-peak.

The detector used in the preferred embodiment of the digital system is a two state device adapted to respond only to a predetermined desired difference frequency signal. If the desired difference frequency signal is present, the output of the detector is in a first state; if the predetermined difference frequency signal is not present, the output of the detector is in a second state. A number of different types of detectors can be used including quadrature detectors, amplitude detectors, or phase lock loops. In the preferred embodiment of the digital version of the system, the detector comprises an FM discriminator 24 and a Schmitt trigger 26, which produces first and second voltages, V1 and V2 depending on the output of the FM discriminator. If a difference signal is detected, the Schmitt trigger of the detector will produce an output signal at voltage V2 which will clock the flip-flop 28. The transmitted frequency of the transceiver is determined by two oscillators 30 and 32, with only one of the oscillators being active at any given time. The flip-flop 28 output (Q or Q) determines which of the respective oscillators is active. When the flip-flop 28 changes state, the transceiver will change from one frequency to the other frequency. The output signal produced by the respective oscillator 30 or 32 is isolated in isolator 34 and is amplified by the amplifier 36. The amplified output signal is coupled to the antenna 14 or other appropriate transducer for transmission on the signal path.

The transceiver 12a, shown in FIG. 1, contains essentially the same components as the above described components of transceiver 12. These components are designated by reference numerals 14a-36a, respectively. At the second transceiver 12a, the signal from the first transceiver is mixed, amplified, detected, and applied to the clock input of a flip-flop 28a. The flip-flop 28a in transceiver 12a changes the frequency of the signal sources 30a and 32a if a predetermined difference signal is detected, thus completing the feedback path.

The digital system shown in FIG. 1 can be adapted to operate in either a positive feedback or a negative feedback mode. The circuit components of the digital embodiment shown in FIG. 1 will be essentially the same for both the positive and the negative feedback mode. However, the frequencies used in certain components will be slightly different for the two modes of operation. For convenience of illustration, the frequency combinations for both the positive and the negative feedback embodiments have been illustrated in FIG. 1. In the negative feedback embodiment, a total of two output frequencies are used in the oscillators of transceivers 12 and 12a. For example, oscillators 32 and 32a could each be set to produce an output signal at frequency f1 and oscillators 30 and 30a could each be set to produce an output signal at frequency f2. For the negative feedback embodiment, the desired difference frequencies fA and fB input to the IF amplifiers 20 and 20a, respectively, will be the same. Therefore, for the negative feedback embodiment of the invention, the desired difference frequency will hereafter sometimes be referred to simply as frequency "f".

In the positive feedback embodiment of the invention, a total of four output frequencies are used, e.g., f1, f2, f3, and f4. The oscillators 32 and 30 of the first transceiver 12 could be set to produce output signals having frequencies f1 and f2, respectively, and the oscillators 32a and 30a of the second transceiver 12a could be set to produce output signals having frequencies f3 and f4. The exact frequencies of the above mentioned output signals are selected to produce predetermined difference frequencies fA and fB in the first and second transceivers, as discussed in greater detail below.

For the positive feedback mode, the detector frequencies and signal source frequencies are set such that the difference frequencies of the signal source from transceiver 12 and transceiver 12a are equal to either the detector frequency of transceiver 12 or transceiver 12a, to cause astable clocking (oscillation). The astable clocking will be sustained at a frequency determined by the signal path round trip path delay. This delay will generally be set by the detector time constant, although the transceivers can be designed to sustain astable oscillation at a frequency determined by other components in the closed loop signal path.

In the negative feedback mode, the transceivers randomly shift frequency on noise until each transceiver detects the signal from the other transceiver. Once the signal is detected, the transceivers "lock" on a particular frequency and continue to transmit on the locked frequency until disturbed by modulated signal input or noise.

Operation of the positive and negative feedback versions of the digital embodiment of the invention communications system can be understood by referring to the schematic block diagram of FIG. 1 and the frequency diagrams of FIGS. 3a-3e and FIGS. 4a-4e. In the illustrations of FIGS. 3a-3e and FIGS. 4a-4e and the following discussion, transceivers 12 and 12a will sometimes be referred to as transceivers 1 and 2, respectively. First, the operation of the system in the negative feedback mode will be summarized. Following the signal through the transceiver pair of FIG. 1, one of the two oscillators 32 or 30 of transceiver 12 will produce a signal (f1 or f2) which is coupled through isolator 34 to power amplifier 36. This amplifier drives the antenna 14, and the f1 or f2 signal is received by the antenna 14a of the transceiver 12a. The received signal is isolated from the output of the second transceiver output amplifier by an isolator 16a. The received signal is coupled to the mixer 18a where the signal from the power amplifier 36a mixes with the received signal to produce a sum or difference signal (f1 or f2±f1 or f2). The symbol "±" as used herein is understood to mean "plus or minus" in the context of the discussion of the difference frequencies. This signal is amplified in IF amplifier 20a, limited in limiter 22a, and detected by the FM discriminator 24a (producing an output level change). The Schmitt trigger 26a is set to indicate the presence of a signal when the threshold voltage is exceeded. When the predetermined difference frequency is detected, the Schmitt trigger 26a then changes state and clocks the flip-flop from Q to $\bar{Q}$ or vice versa. In either case, a different frequency is selected when a signal is detected. If the correct frequency signal is not received, the mixer 18a will not produce a sum or difference frequency detectable by the discriminator 24a, so the Schmitt trigger output drops to V1. The signal from the selected oscillator (f2 or f1) is amplified in this second transceiver, coupled to antenna 14a, and received back at the first transceiver by the first transceiver's antenna 14. The return signal is isolated from the power amplifier output and is applied to a mixer 18 where it produces a sum or difference frequency (f1 or f2±f2 or f1) which is again amplified, limited, and detected by FM discriminator 24. As with the second transceiver, a Schmitt trigger 26 changes state from V1 to V2 when a signal is detected. This change in state clocks the flip-flop 28 to select the other oscillator (f1 or f2).

When no signal is present, for example when one transceiver is turned off, the other transceiver output randomly changes state between f1 and f2 because random noise pulses will be detected and will clock the flip-flop. When both transceivers are detecting the transmitter signals, the Schmitt triggers will stop triggering the flip-flops. This will occur in both transceivers since each transceiver will detect a signal as soon as the difference frequency (or sum) is correct. This, of course, happens eventually because the noise signals are randomly clocking the flip-flops. When both transceivers stop triggering, they are "locked". Unlocking can occur due to noise, turning off one transceiver, or low signal level. Also, modulation input introduced as set or reset signals to the flip-flop, as shown in FIG. 1, will also cause the transceivers to break "lock," then quickly "relock" when the signal "rings around" to the other receiver, thus transmitting data from one transceiver to the other.

Figure 3A:
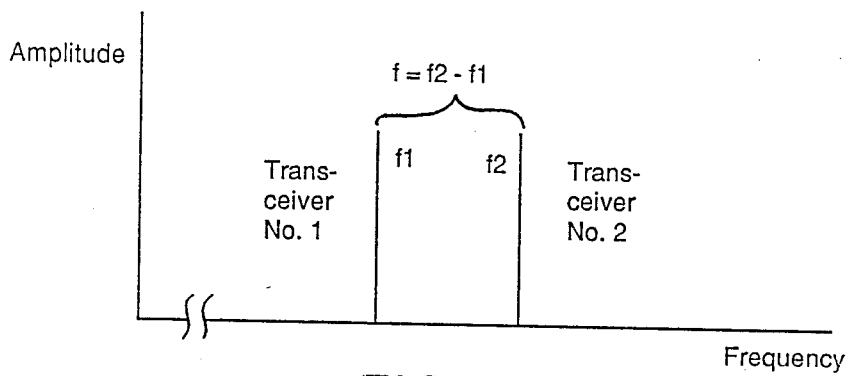
FIGS. 3a-3e are graphical illustrations of possible frequency combinations for a digital version of the preferred embodiment of the communications system of the present invention operating in negative feedback mode.
Figure 3B:
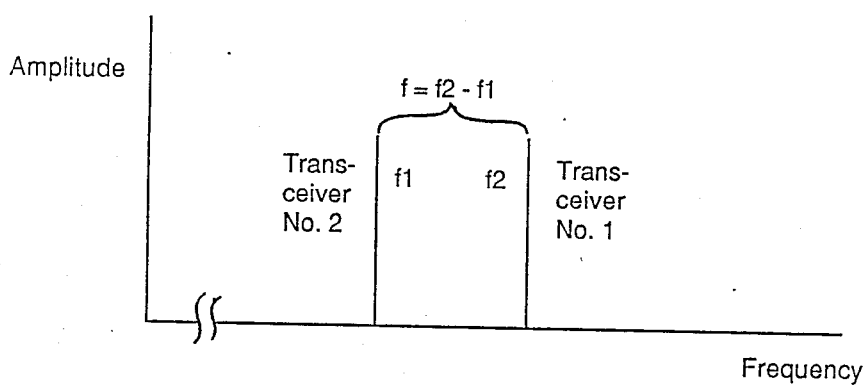
Figure 3C:
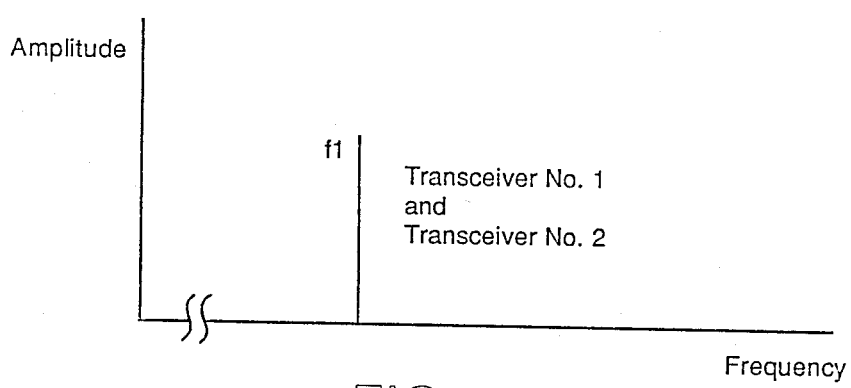
Figure 3D:
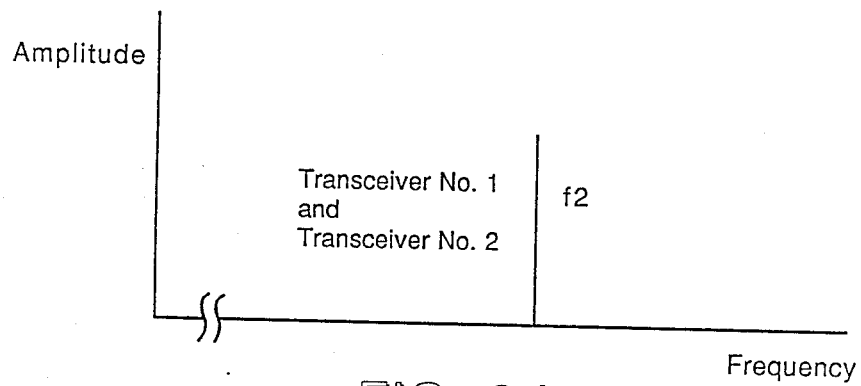
Figure 3E:
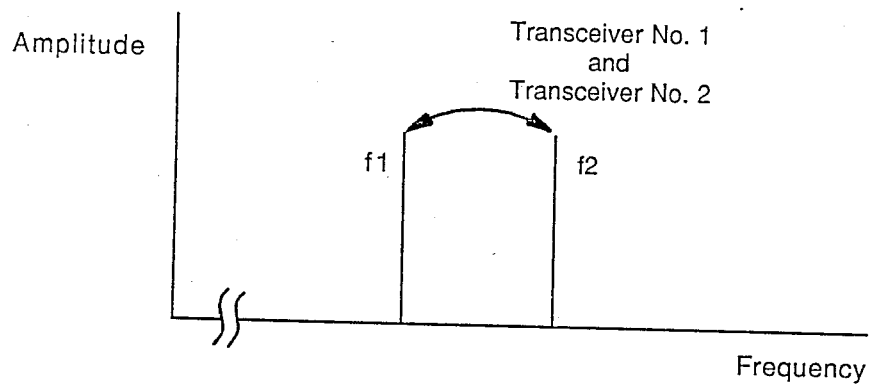

The possible frequency combinations which can produce the conditions discussed above are shown in FIGS. 3a-3e. In FIG. 3a, transceiver 1 produces an output signal having frequency f1 while transceiver 2 produces an output signal having frequency f2. This combination of output frequencies produces difference frequency "f" resulting in a "locked" condition between the transceiver pairs. In FIG. 3b, transceiver 1 produces an output signal having frequency f2, while transceiver 2 produces an output signal having frequency f1. Again, this produces a difference frequency "f" which will result in a "locked" condition between the transceiver pair. In FIGS. 3c and 3d, however, the two transceivers are each producing f1 or f2, respectively. In either of these cases, the system will be operating in the "unlocked" condition. Finally, in FIG. 3e, the composite modulation, or unlocked conditions are shown for the negative feedback mode of operation. Basically, this figure illustrates that the two transceivers are shifting between the two frequencies f1 and f2 in accordance with the detection of the difference frequencies, as discussed above.

As was discussed above, the communications system of the present invention can be modified to operate in a positive feedback mode to produce a positive astable oscillation instead of frequency "lock." The positive feedback operation is very similar to the negative feedback operation, with the exception that more transmit frequencies are required. It is possible to design a positive feedback communications system with two frequencies (f1 and f2) as with the negative feedback version, but such a design would depend on random noise to clock one of the transceivers to the second frequency when both transceivers were transmitting on f1 or f2. This would produce an astable oscillation with a very unstable repetition rate. To avoid this situation, a total of four frequencies f1, f2, f3 and f4 are selected to assure that at least one of the transceivers is receiving a signal from the other transceiver when the signal-to-noise ratio is adequate to sustain astable oscillation.

For the positive feedback versions of the invention communications system, the oscillators 32 and 30 of the first transceiver produce an output signal having either frequency f1 or f2, while the oscillators 32a and 30a of the second transceiver produce an output signal having frequency f3 or f4. The above-referenced frequencies are selected to produce a frequency difference of fA or fB in the first and second transceivers, respectively. The possible values for the frequencies are shown in FIGS. 4a–4e. The possible values for fA will be one of the following sums or differences in the frequencies: f1±f3 or f2±f4. The possible values for fB will be one of the following sums or differences in the frequencies: f3±f2 or f4±f1.

Figure 4A:
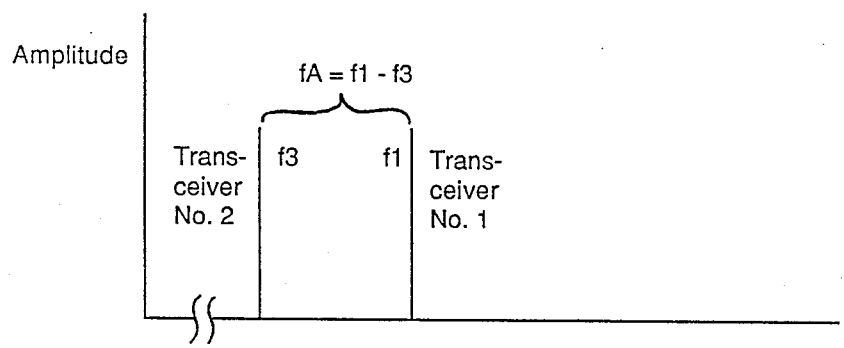
FIGS. 4a-4e are graphical illustrations of possible frequency combinations for a digital version of the preferred embodiment of the communications system of the present invention operating in positive feedback mode.
Figure 4B:
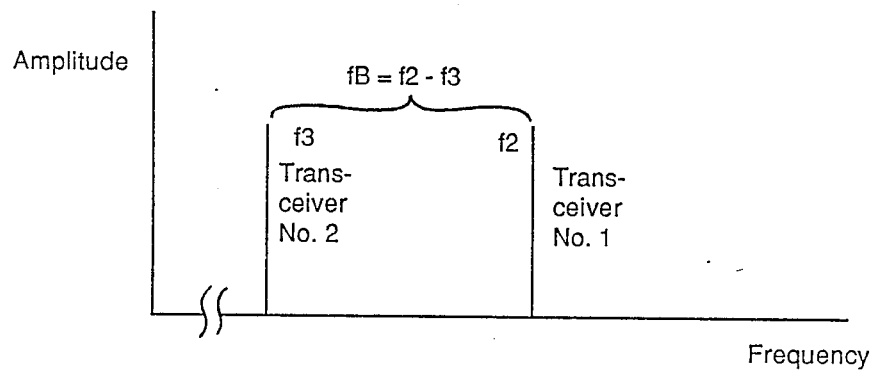
Figure 4C:
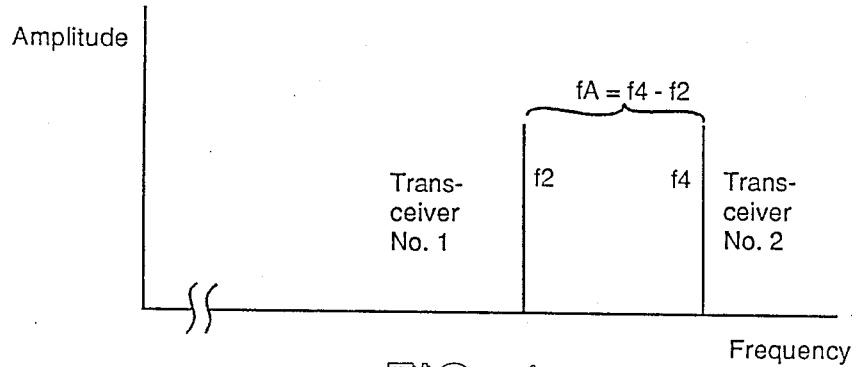
Figure 4D:
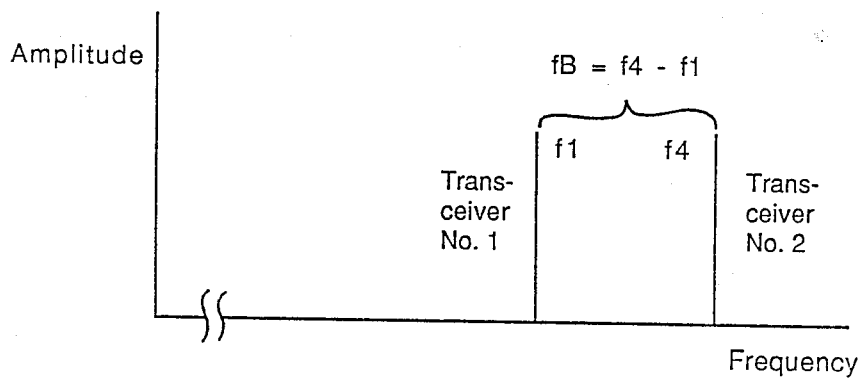
Figure 4E:
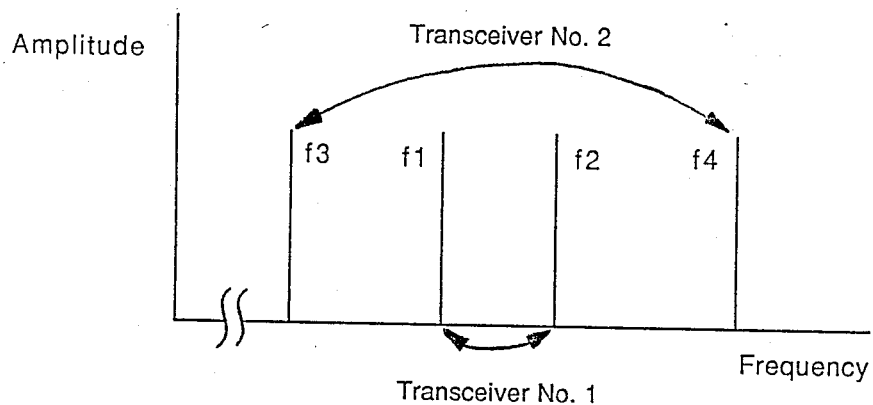

In FIG. 4a, transceiver 1 produces an output signal f1, while transceiver 2 produces output signal f3, thus resulting in a frequency difference fA=f1−f3. In FIG. 4b, transceiver 1 produces output signal frequency f2, while transceiver 2 produces an output signal at frequency f3, resulting in a frequency fB=f2−f3. FIGS. 4c and 4d show alternate combinations for the two transceivers for difference frequencies defined by fA=f4−f2 and fB=f4−f1. Finally, FIG. 4e is a graphical illustration of the composite frequency hopping scheme for the various frequency combinations described above. This figure illustrates that transceiver 1 shifts between frequencies f1 and f2, while transceiver 2 shifts between frequencies f3 and f4, in accordance with the detection of the difference frequencies as discussed above.

Analog versions of the invention communications system are also possible, with a preferred embodiment comprising transceivers 11 and 11a being shown in FIG. 2. Referring to FIG. 2, it can be seen that the analog transceivers comprise many of the same components as the digital transceivers shown in FIG. 1. However, in the detector of the analog transceivers, an FM discriminator is used to control a differential amplifier, e.g., amplifier 40 of transceiver 11 shown in FIG. 2. The output of the differential amplifier 40 is used to control a voltage controlled oscillator 42, which determines the output frequency of the transceiver. Data is transmitted by providing a modulated input signal to the input terminals of differential amplifiers 40 and 40a, as shown in FIG. 2.

Figure 5:
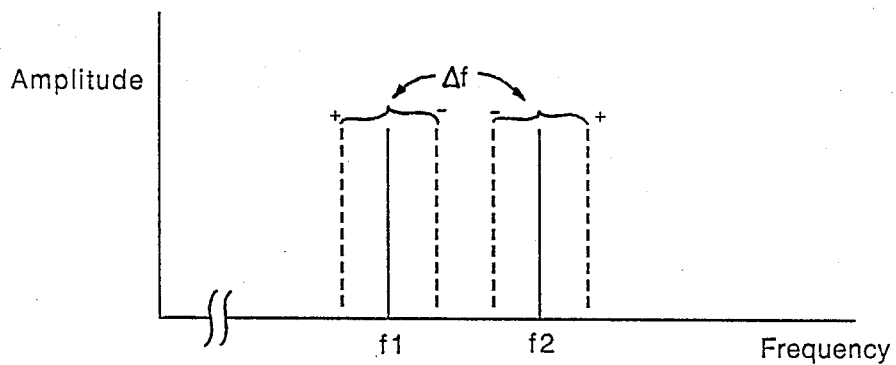
FIG. 5 is a graphical representation of the possible frequency ranges for an analog version of the preferred embodiment of the communications system of the present invention operating in positive feedback mode.
Figure 6:
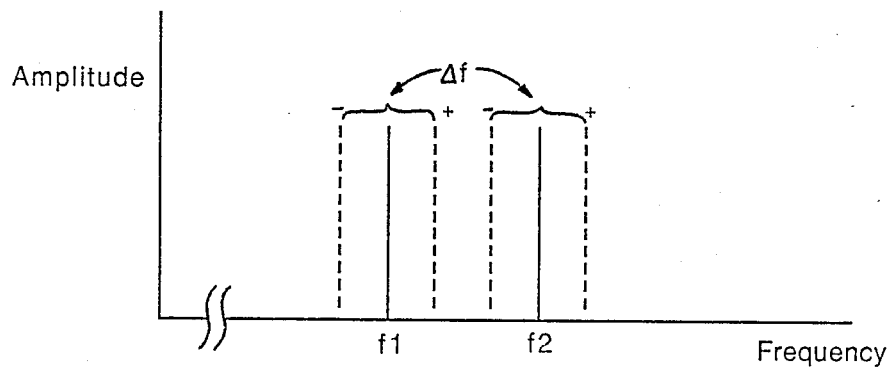
FIG. 6 is a graphical representation of the possible frequency ranges for an analog version of the preferred embodiment of the communications system of the present invention operating in negative feedback mode.

Operation of the analog embodiment of the invention communications system can be understood by referring again to the schematic block diagram of FIG. 2 and to the frequency diagrams of FIGS. 5 and 6. Each of the analog transceivers shown in FIG. 2 operate on one of two center frequencies, f1 or f2. In the following discussion, the operation of the transceiver pair will be described in connection with the positive feedback embodiment with a first transceiver transmitting a signal at frequency f1 and a second transceiver transmitting a signal at a second frequency f2. If the second transceiver receives a signal from the first transceiver at frequency f1, the f1 signal is mixed in mixer 18a with the output of the second transceiver either by direct insertion of the f2 signal into the mixer or by leakage through the isolator 16a. The sum or difference frequency (f2±f1) is amplified by the IF amplifier 20a. For purposes discussion, the sum frequency, f1+f2, will be used as an example. This amplified signal is amplitude limited in limiter 22, then detected by a conventional FM discriminator 24a producing a higher voltage V2 for positive frequency deviation and a lower voltage V1 for a negative frequency deviation from the center frequency (f1+f2). The output of the discriminator produces a control voltage which is then inverted by the differential amplifier 40a so that the voltage-tuned oscillator 42a produces a lower output frequency as the control voltage is increased. In general, the change in the frequency of the output signal produced by voltage tuned oscillator 42a of transceiver 11a (or voltage controlled oscillator 42 of transceiver 11) can be represented by $\Delta f$. This output signal is then transmitted from the antenna 14a of transceiver 11a. Continuing on with the signal, the output of the second transceiver 11a is received at the antenna of the first transceiver 11. Again, as in the second transceiver, the received signal is isolated from the transmitted signal, mixed with the transmit signal (f1) in mixer 16 to produce a sum frequency (f1+f2+$\Delta f$) which is amplified by the IF amplifier 20, limited in limiter 22, and then detected by an FM discriminator 24. As in the other transceiver, the discriminator output is inverted so that an increasing output voltage from the discriminator produces a lower output frequency as the control voltage to the voltage tuned oscillator 42 is increased. The output (f1) from the voltage tuned oscillator 42 is amplified and transmitted through the antenna 14 to the second transceiver. This completes the primary feedback path.

Although the above discussion is directed to a positive feedback embodiment of the analog transceiver system, it is apparent that the system shown in FIG. 2 can easily be modified to operate in the negative feedback mode. The principal difference between the positive and negative feedback mode of operation is the inversion of the output signal produced by the FM discriminator. The input terminals of the differential amplifier 40 have been labeled with "∓" (modulated input) and "∓" (FM discriminator) to illustrate the difference in the effect of the respective input signals for the positive and negative feedback embodiments. For the positive feedback embodiment, the input terminal connected to the FM discriminator would be "+", while the input terminal for the modulated input would be "−". Conversely, for the negative feedback embodiment, the input terminal connected to the FM discriminator would be "−", while the input terminal for the modulated input would be "+".

FIG. 5 is a graphical illustration of the frequency deviation relationship between f1 and f2 for a transceiver pair operating in the positive feedback mode. A deviation $\Delta f$ in f1 frequency produced by the first transceiver 11 in the positive direction will tend to result in a corresponding negative deviation in the f2 frequency produced by the second transceiver 11a. FIG. 6 is a graphical illustration of the frequency deviation relationship between f1 and f2 for a transceiver pair operating in the negative feedback mode. A positive deviation $\Delta f$ in f1 frequency produced by the first transceiver 11 will tend to result in a corresponding positive deviation in the f2 frequency produced by the second transceiver 11a.

It is evident that there are two secondary feedback loops within the primary feedback loop between the two transceivers shown in FIG. 2. These secondary feedback loops exist because the output frequency from the mixer in each transceiver is not only proportional to the frequency of the other transceiver, it is also proportional to the output frequency of the voltage-tuned oscillator of each transceiver. Each transceiver has a secondary negative feedback loop. The feedback is negative because, as the frequency of the voltage tuned oscillator increases the voltage from the differential amplifier (oscillator control voltage) decreases. The feedback from either transceiver is also negative because, as its frequency increases, the control voltage decreases because the sum (f1+f2) increases. This produces an increasing output from the discriminator which is inverted by the differential amplifier, producing a reduction in the frequency f1 and f2.

Care must be exercised in the design of the feedback loop gain and phase characteristics to ensure that at any frequency within the feedback loops the gain is less than unity for any phase shift approaching an in-phase condition. Of course, if this occurs oscillation will be produced. This possibility of oscillation is exactly what is desired in the positive feedback version of the analog transceiver. By inverting one of the drive voltages to the voltage-tuned oscillator or only one of the transceivers, the total loop phase shift is in phase at some frequency determined by the total loop time delay. This oscillation can be modulated and used as a subcarrier while at the same time monitoring its frequency, amplitude, and noise characteristics to determine the status of the feedback path between the two transceivers.

The path delay sets an upper limit on the oscillation that can be produced by positive feedback between transceivers. For special separations resulting in delay times of fractions of a second, the oscillation would be on the order of one or more hertz. Obviously, modulation of such a low frequency subcarrier would be of limited value except for extremely low data rates. However, data obtainable from the oscillation, its frequency, amplitude, and noise may be useful. The frequency of the oscillation does not reduce the data rate of information transmitted from one transceiver to the other. It only affects the data rate at which confirmation of the data around the path can be performed.

The digital transceivers 12 and 12a shown in FIG. 1 also have two secondary feedback loops, one in each transceiver. As in the analog version, these secondary loops exist because the transceiver local oscillator frequency and the output frequency of the other transceiver both affect the state of the flip-flop. The flip-flops 28 and 28a are analogous to the differential amplifiers used in the analog transceivers 11 and 11a to vary the frequency of the voltage-tuned oscillator. The digital signal negative feedback version of the invention communications system uses an FM discriminator and Schmitt trigger as the detector.

Figure 7:
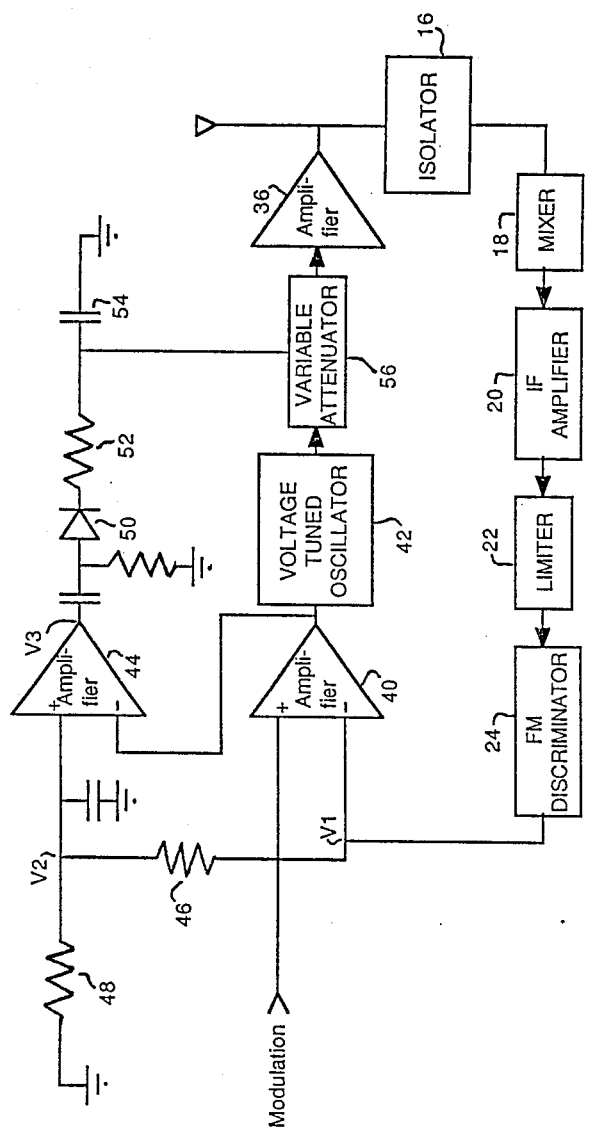
FIG. 7 is a schematic block diagram showing one transceiver of the preferred embodiment of the communications system of the present invention provided with an automatic power control.

FIG. 7 is a schematic block diagram of one transceiver of the invention communications system comprising circuit components for providing automatic power control for the transceiver. This embodiment of the transceiver comprises many of the circuit components discussed above. A signal is received at antenna 14' and is mixed in mixer 18 with the output signal of the transceiver to produce a difference frequency. The difference frequency produced by the mixer 18 is then amplified by an IF amplifier 20 to a level sufficient for detection and limited in limiter 22 to a level appropriate for the FM discriminator 24. The output of the FM discriminator is provided both to the negative terminal of the differential amplifier 40 and to the positive terminal of the automatic power control differential amplifier 44. The output signal of the differential amplifier 40 is used to control the voltage tuned oscillator 42. This output signal is also used as a feedback signal for the negative input terminal of the differential amplifier 44 of the automatic power control. The level of the signal provided to the positive terminal of the differential amplifier 44 is divided by resistors 46 and 48 to be at the same level as the output signal of the differential amplifier 40 which is provided to the negative input of the terminal of the differential amplifier 44.

Figure 8A:
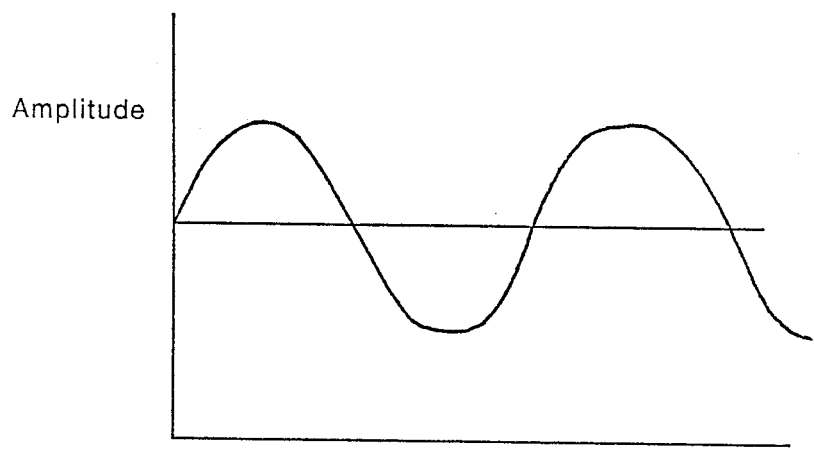
FIGS. 8a-8d are graphical illustrations of detected signals and noise signals for a transceiver of the preferred embodiment employing an automatic power control.
Figure 8B:
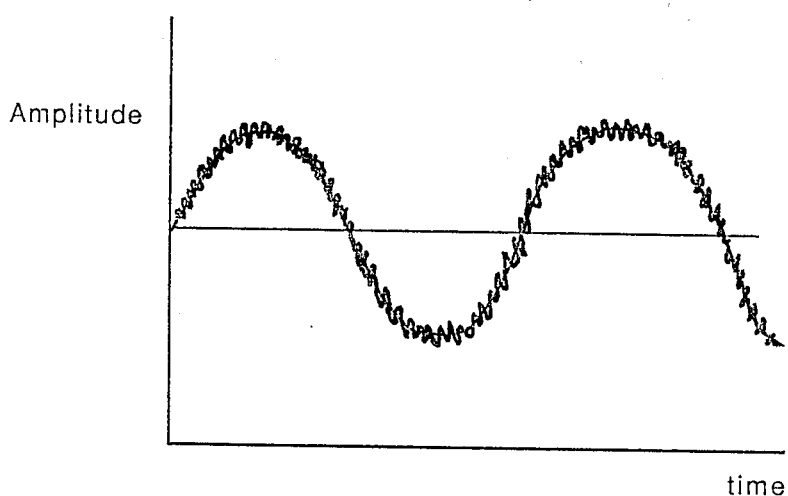
Figure 8C:
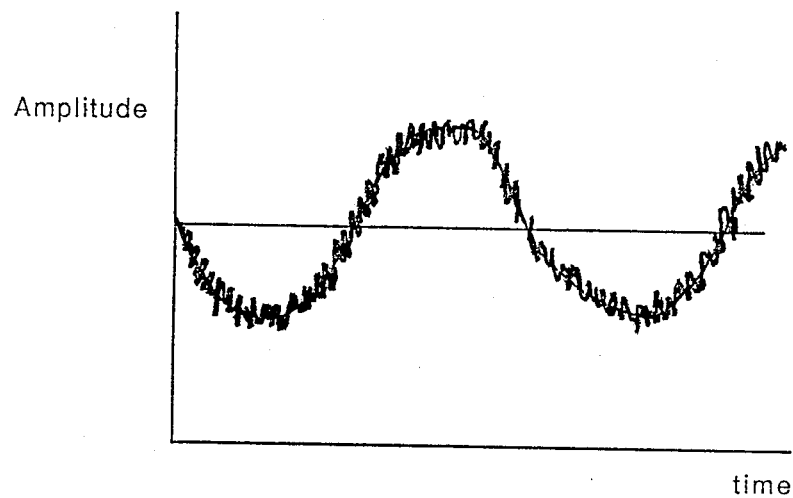
Figure 8D:
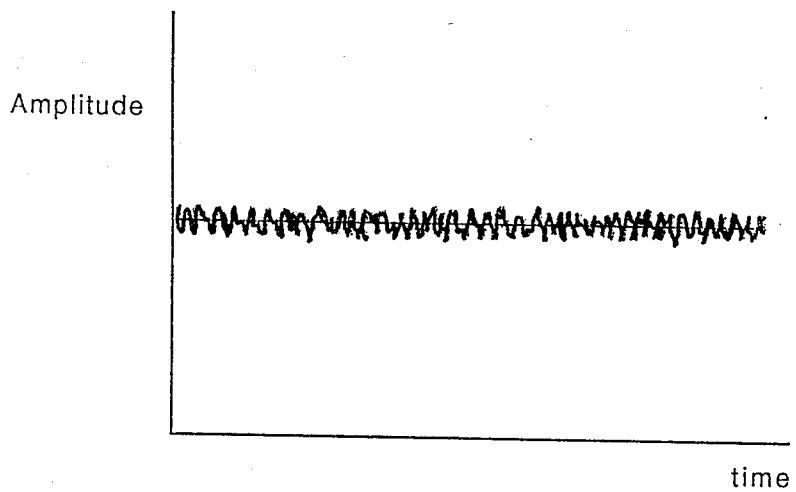

Operation of the automatic power control can be understood by referring to the graphical illustrations of FIGS. 8a–8d. FIGS. 8a and 8b show typical waveforms for a pair of transceivers operating in a closed loop negative feedback configuration with modulation applied to the positive input of the amplifier 40 as shown in FIG. 7. FIG. 8c shows the output of the automatic power control amplifier 44 with the input signals shown in FIGS. 8a and 8b. Note that the modulation signal has been cancelled at the output of the amplifier 44, because the received signal from the other transceiver is the same amplitude and approximately 180 degrees out of phase with the modulation signal applied to the transceiver (effective phase because of the use of the differential amplifier), with only minor phase shift being attributed to circuit and path delay. What remains is the noise introduced into the closed loop between the two transceivers by the medium and the transceiver circuits. This noise signal is illustrated graphically in FIG. 8d. Because the link between the two transceivers is normally limited by the transmission medium, the circuit noise is normally negligible in comparison. The signal-to-noise ratio of the received signal will normally worsen because the received signal level has been attenuated by distance or physical obstructions, or the noise in the medium has increased. Therefore, the noise signal at the output of the automatic power control amplifier 44 is directly proportional to the noise within the closed loop between the two transceivers produced by the medium. If the noise signal is detected by diode 50 and filtered by resistor 52 and capacitor 54, a DC voltage proportional to the noise will be produced. This DC voltage is applied to the variable attenuator 56, which is adapted to decrease the attenuation as the noise proportional voltage increases. This causes the output of the amplifier 36 to increase as the amplitude of the noise signal increases. Therefore, there is an increase in the signal-to-noise ratio of the closed loop path between the transceivers and a related decrease in the noise on the received signal. As the noise on the received signal decreases, the output from the transceiver power amplifier 36 decreases until equilibrium is reached at some predetermined signal-to-noise ratio.

The communications system provided by the present invention offers numerous advantages over previous systems. Because the data transmission will only occur when each transceiver is able to detect the signal from the other, there is immediate confirmation of signal reception as long as the oscillation is maintained. For example, in the positive feedback mode, noise, circuit failure, or barriers degrading the signal path will cause the astable oscillation to slow or cease. Thus it can be seen that on a pulse by pulse (or bit by bit) basis, the reception of a signal within the correct time confirms that the pulse (or bit) previously sent by one transceiver was received by the other. Bad data is immediately recognized.

The invention communications system also has an adaptive data rate. Depending on the type of detector used in each transceiver, the detection time can be made a function of the signal-to-noise ratio of the received signal. If the detection time decreases as the signal-to-noise ratio increases (phase lock loop detectors), the clocking rate of the transceivers will increase as the signal-to-noise ratio improves and decrease as the signal-to-noise ratio worsens. This will help maintain the bit error rate constant no matter how degraded the signal path becomes.

The invention system can be adapted to operate on a spread spectrum. In the astable oscillation mode of the preferred embodiment, the signal sources of both transceivers hop between two states. This distributes the signals over a frequency band set by the difference between the lowest and highest transmitted frequency. Potential interference with fixed signal reception is reduced because the average in band power seen by a fixed frequency receiver is reduced. The signals of several transceiver pairs may be interleaved, with minimal interference, to make use of the available spectrum.

The communications system of the present invention also has the advantage of being frequency keyed. Since a very limited number of frequencies must be compatible between a transceiver pair, the possibility of receiving data from another transceiver operating in the same area or near the same frequency is extremely small. Only the transceiver pair with the correct transmit and detection frequencies will exchange coherent data.

Finally, the communications system of the present invention offers the advantage of almost simultaneous transmission and reception of data. By bit selection either hardwired or software programmed into a processor, the transmitted and received pulses can be alternated to allow each transceiver to modulate every other pulse, or word, or selected group of words. The transceivers can, of course, be programmed to function as conventional transceivers with one unit sending and the other unit receiving as needed.

While the method and apparatus of the present invention has been described in connection with the preferred embodiment, it is not intended to limit the invention to the specific form set forth herein, but on the contrary, it is intended to cover such alternatives, modifications and equivalents as may be included within the spirit and scope of the invention as defined by the appended claims.

I claim:

1. A communications system comprising:
a first transceiver comprising (a) a first signal source for producing a first output signal having either a first frequency or a second frequency; (b) means for controlling said signal source to cause said first output signal to have either said first or said second frequency; (c) means for receiving an input signal from a second signal source and for mixing said input signal with said first output signal of said first signal source to produce a first difference frequency determined by the relative difference between the frequency of said received input signal and the frequency of said first output signal; (d) first detector means responsive to said first difference frequency to cause said means for controlling said first signal source to cause said first output signal to shift from said first frequency to said second frequency;
a second transceiver comprising (e) a second signal source for producing a second output signal having either said first frequency or said second frequency; (f) means for controlling said second signal source to cause said second output signal to have either said first or said second frequency; (g) means for receiving the first output signal produced by said first signal source in said first transceiver and for mixing said received signal with said second output signal of said second signal source to produce a second difference frequency determined by the relative difference between said received signal and said second output signal; (h) second detector means responsive to said second difference frequency to cause said second output signal produced by said second signal source to change from said first frequency to said second frequency, said change from said first to said second frequency causing a detectable change in said first difference signal in said first transceiver thus defining a feedback data path between said first and said second transceiver.

2. The communications system according to claim 1, said first and second detectors each comprising an FM discriminator and a Schmitt trigger, said Schmitt trigger producing an output signal upon detection of the respective difference frequencies of said first and second transceivers.

3. The communications system according to claim 2, said means for controlling said first and second signal sources of said first transceiver and said means for controlling said second and third signal sources of said second transceiver each comprising a flip-flop circuit, said respective detectors of said first and second transceivers providing a control signal for the clock of said flip-flop circuit.

4. The communications system according to claim 3, said first signal source comprising first and second oscillators producing said first and second output frequencies, respectively, said second signal source comprising third and fourth oscillators producing said first and second output frequencies, respectively.

5. The communications system according to claim 4, said change said feedback response being negative feedback.

6. A communications system comprising:
a first transceiver comprising (a) a first signal source for producing a first output signal having either a first frequency or a second frequency; (b) means for controlling said signal source to cause said first output signal to have either said first or said second frequency; (c) means for receiving an input signal from a second signal source and for mixing said input signal with said first output signal of said first signal source to produce a first difference frequency determined by the relative difference between the frequency of said received input signal and the frequency of said first output signal; (d) first detector means responsive to said first difference frequency to cause said means for controlling said first signal source to cause said first output signal to shift from said first frequency to said second frequency;
a second transceiver comprising (e) a second signal source for producing a second output signal having either a third frequency or a fourth frequency; (f) means for controlling said second signal source to cause said second output signal to have either said third or said fourth frequency; (g) means for receiving the first output signal produced by said first signal source in said first transceiver and for mixing said received signal with said second output signal of said second signal source to produce a second difference frequency determined by the relative difference between said received signal and said second output signal; (h) second detector means responsive to said second difference frequency to cause said output signal produced by said second signal source to change from said third frequency to said fourth frequency, said change from said third to said fourth frequency causing a change in said first difference signal in said first transceiver thus defining a feedback data path between said first and said second transceiver.

7. The communications system according to claim 6, said first and second detectors each comprising an FM discriminator and a Schmitt trigger, said Schmitt trigger producing an output signal upon detection of the respective difference frequencies of said first and second transceivers.

8. The communications system according to claim 7, said means for controlling said first and second signal sources of said first transceiver and said means for controlling said second and third signal sources of said second transceiver each comprising a flip-flop circuit, said respective detectors of said first and second transceivers providing a control signal for the clock of said flip-flop circuit.

9. The communications system according to claim 8, said first signal source comprising first and second oscillators producing said first and second output frequencies, respectively, said second signal source comprising third and fourth oscillators producing said third and fourth output frequencies, respectively.

10. The communications system according to claim 9, said change said feedback response being positive feedback.

11. A communications system comprising:
a first transceiver comprising (a) a first signal source for producing an output signal having a first center frequency; (b) means for controlling said signal source to cause a deviation from said first center frequency; (c) means for receiving an input signal from a second signal source and for mixing said signal with said output signal of said first signal source to produce a first difference frequency determined by the relative difference between the frequency of said received signal and the frequency of said first output signal; (d) first detector means responsive to said first difference frequency to cause said means for controlling said first signal source produce a control signal to cause said predetermined deviation from said first center frequency;

a second transceiver comprising (e) a second signal source for producing a second output signal having a second center frequency; (f) means for controlling said second signal source to cause a deviation from said second center frequency; (g) means for receiving said first output signal produced by said first signal source in said first transceiver and for mixing said received signal with said second output signal of said second signal source to produce a second difference frequency determined by the relative difference between said received signal and said second output signal; (h) second detector means responsive to said second difference frequency to produce a control signal to cause said deviation from said second center frequency, said deviation from said second center frequency causing a change in said first difference signal in said first transceiver and thereby defining a feedback data path between said first and said second transceiver.

12. The communication system according to claim 11, said first and second signal sources comprising voltage tuned oscillators.

13. The communications system according to claim 12, said respective first and second detectors each comprising a differential amplifier and a FM discriminator, said FM discriminator being connected to one input terminal of said differential amplifier, said differential amplifier producing a control signal for controlling the output frequency of the voltage tuned oscillator of the respective transceiver, said respective FM discriminators being responsive to changes in said difference frequencies to cause a change in the output signal produced by said differential amplifier thus causing a deviation in the center frequency of the respective voltage controlled oscillator.

14. The communications system according to claim 13, said output signal of said respective differential amplifiers defining a negative feedback relation between said first and second transceivers.

15. The communications system according to claim 13, said output signal of said respective differential amplifiers defining a positive feedback relation between said first and second transceivers.

16. The communications system according to claim 13, with at least one of said transceivers comprising an automatic power control system for maintaining a predetermined signal-to-noise ratio between the detected input signal and the noise detected by the transceiver.

17. The communications system according to claim 16, said automatic power control system comprising a variable attenuator for controlling the level of the output signal produced by the transceiver.

18. The communication system according to claim 17, said automatic power control system comprising a differential amplifier having first and second input terminals, said first input terminal being connected to said FM discriminator, said second terminal being connected to the output terminal of the differential amplifier producing said control signal for said voltage tuned oscillator, said differential amplifier of said automatic power control system producing an output signal for controlling said variable attenuator.

* * * * *